Dec. 27, 1932.  C. B. HILLHOUSE  1,892,559
METHOD OF DISSOCIATING NATURAL GAS
Filed March 4, 1930  3 Sheets-Sheet 1

Charles B. Hillhouse Inventor
By his Attorney W. A. Sparks

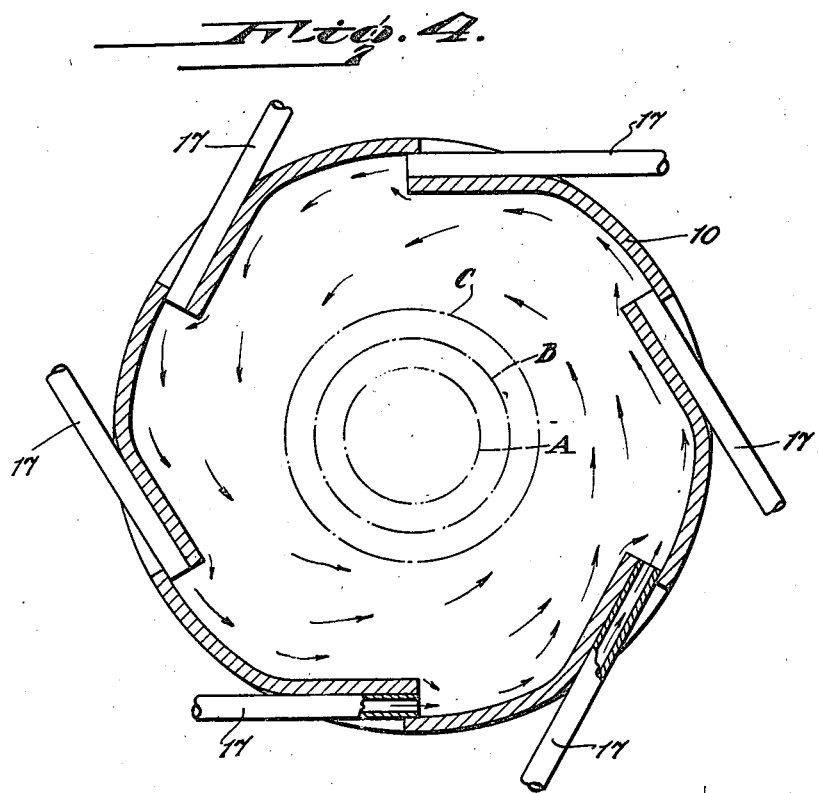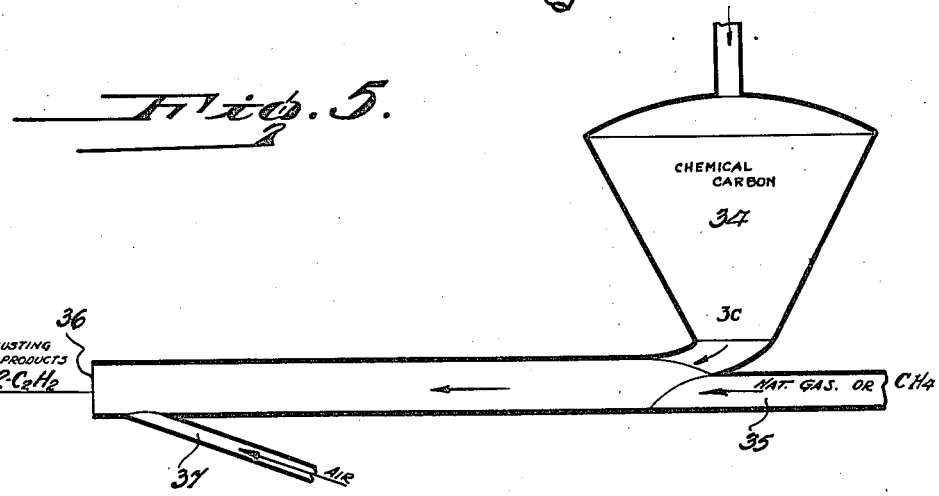

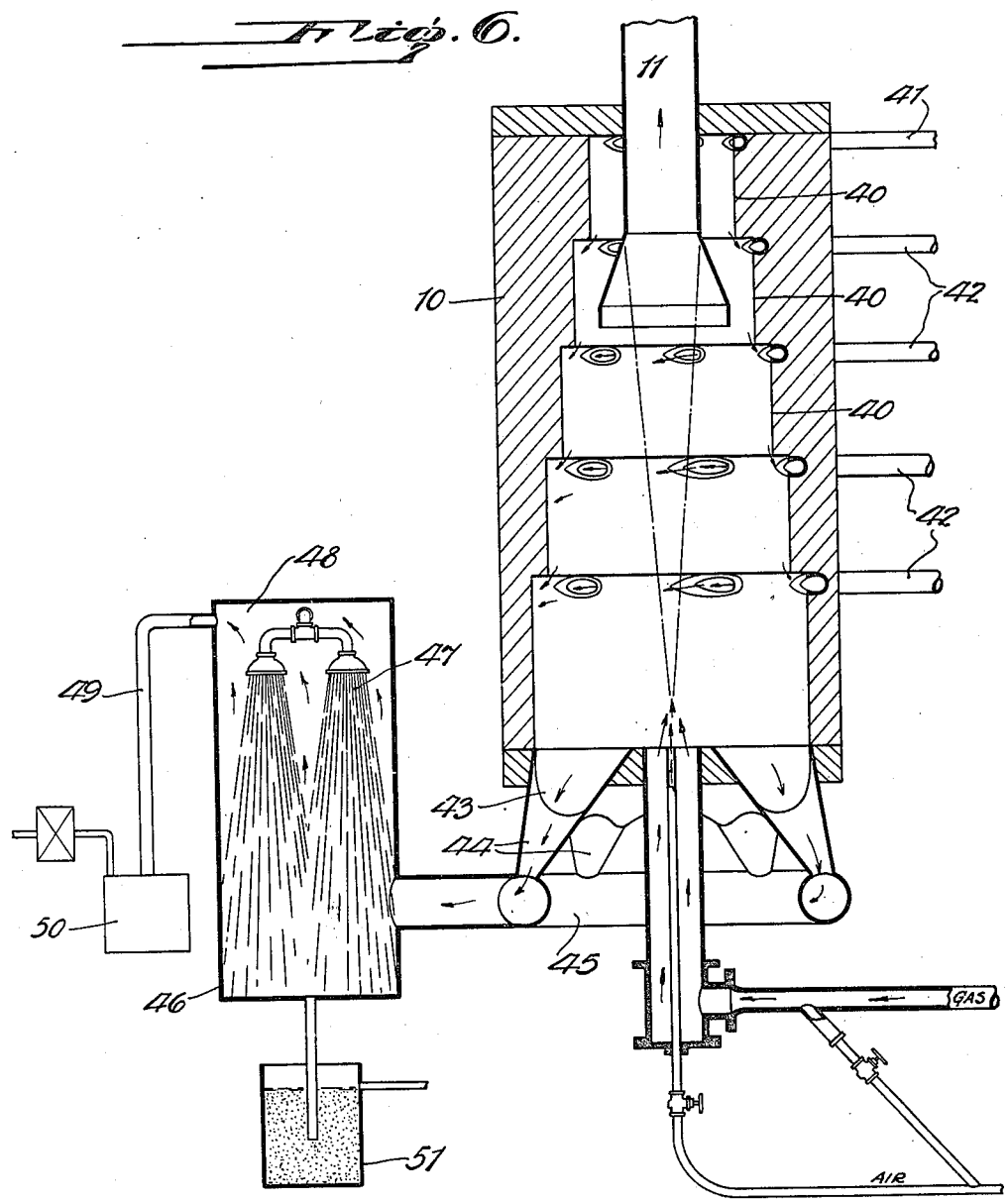

UNITED STATES PATENT OFFICE

CHARLES B. HILLHOUSE, OF NEW YORK, N. Y.

METHOD OF DISSOCIATING NATURAL GAS

Application filed March 4, 1930. Serial No. 433,049.

This invention relates to a method of decomposing natural gas, in which supercombustion may be used, so as to obtain its carbon and hydrogen, or make it into another gas, as for instance water gas, or a re-formed gas and is a continuation in part of my pending application Ser. No. 346,364 filed March 12, 1929, issued Jan. 26, 1932 as Patent No. 1,842,609, and is related to the subject matter of my applications Ser. No. 631,778, filed April 13, 1923, Ser. No. 17,565 filed March 23, 1925, Ser. No. 176,594 filed Mar. 19, 1927, and Ser. No. 256,722, filed Feb. 24, 1928; and my Italian application 87/146/1928 filed July 23, 1928.

Water gas may be readily made out of carbon dissociated or deposited from natural gas by passing preheated steam into the dissociator or gas generator along with natural gas, or separately passing steam tangentially in next to the wall so that the natural gas may contact and mix with it.

Superheating of combustion of carbonaceous material shown in this process and the type of dissociation shown in Figure 6 are equally applicable to my gas applications above mentioned.

In catalytic work it is highly important, if not absolutely essential, that hydrogen used for hydrogenation purposes such as synthetic combination with nitrogen or other elements should be absolutely pure. A small proportion of "poison" as carbon monoxide or carbon dioxide gas, would seriously impede or perhaps ruin the operation.

The principal expense in producing hydrogen by the Haber-Bosch method is in cleaning the hydrogen after it is obtained. Fifty parts out of the seventy parts of expense are caused by the cleaning of hydrogen and even then some percentage of the "poisons" still remain.

My process lends itself to effectively prevent even the smallest fraction of these gases entering thru the gases of combustion of the axial heating agent. This is accomplished by using pure nitrogen as the gas to surround and shield the axial flame, as shown in the drawings. Pure nitrogen may readily be obtained by ordinary air compression methods, and the semi-pure oxygen used in the process, as for instance in axial combustion.

It is also important to remove moisture present in the natural gas prior to dissociation, so as to avoid making carbon monoxide, and usual methods may be utilized.

One of the objects of the invention is to decompose natural gas in such a manner as to derive pure hydrogen at a very reasonable price so as to render it available for commercial use in various hydrogenation processes.

Another object is to decompose natural gas in such a manner as to derive chemical carbon at a price to make it available commercially for use in various processes such as the manufacture of rubber, stepping up the carbon content of a gas of low flame temperature to produce a gas of higher flame temperature, or to manufacture new gases.

All of these objects are attained by means shown in the accompanying drawings which are all more or less diagrammatic in nature and in which:

Fig. 4 is a sectional view substantially on line 4—4 of Fig. 1.

Fig. 5 is a view showing one means of utilizing the carbon produced by my device.

Fig. 6 is a view similar to Fig. 1 but showing another form of dissociator.

Like characters of reference refer to like parts in all views.

Figure 1:
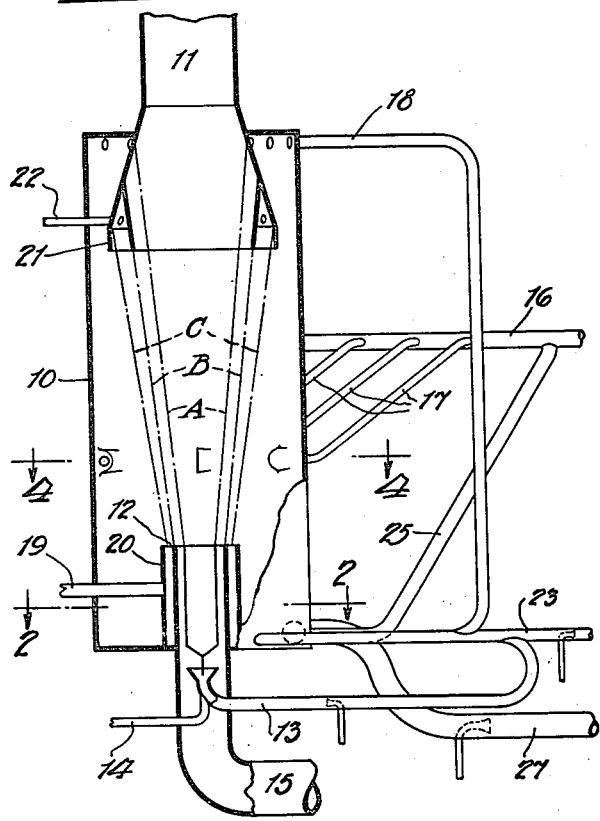
Fig. 1 is a vertical sectional view of one form of device for effecting the dissociation of natural gas.

Referring to the drawings in detail, natural gas may be conducted by a pipe 16 to a dissociating device, one form of which device is shown in Figs. 1, 2, 3 and 4. Heat for the dissociation of this natural gas may be furnished by any desirable means, but in Figs. 1-4, I have shown combustion and supercombustion as the heating agent. The dissociated carbon may be freed from hydrogen by cutting it out from the dissociator, as shown in the drawings, cooling it down and passing it through a blower into a dust catcher. The hydrogen from the dissociated natural gas may be passed thru a pipe 27 to the hydrogenation apparatus or elsewhere.

Turning now to the details of the form of my natural gas dissociating device shown in Fig. 1, and which resembles in many respects my form of gas generator referred to above, 10 represents the outer wall of the chamber, and 11 the flue or vent. A circular flame burner as shown at 12, the same being fed with carbon by a pipe 13 or other carbonaceous material by conduit 14 and air or combustible mixture by a pipe 15. The flame limits are indicated by dot-and-dash lines A and B. The natural gas from a supply line 16 is entered tangentially into the chamber by branch pipes 17 as best shown in Fig. 4. The gas is shot through the pipes 17 under pressure and swirls about the walls of the chamber. Deposited or finely comminuted carbon is entered tangentially into the chamber, at points higher in the furnace than pipes 17, from multiple pipes 18 under pressure, preferably using natural gas as an accelerator and whirls helically downward while being heated. When the whirling carbon particles reach the natural gas zone, as they are in a suspended state between the natural gas and the axial flame, and carbon is the heavier, it is continuously working through the natural gas in showers toward the wall while receiving additions of dissociated carbon. Then new additions of natural gas enter tangentially between the wall and these whirling carbon particles so they pass through the fresh natural gas as before while the natural gas adds new impetus to the whirling mass. The incandescent carbon particles furnish the necessary heat for dissociation of the natural gas they contact with, which heat is being continuously supplied to them by the radiant heat of the axial heating agent.

When the process is once working the addition of dissociated carbon from the natural gas to the whirling sheet of incandescent carbon may equal the amount continuously cut out from the discharging stream at 23. Then the initial carbon used at 18 to start operations may be reduced or otherwise and there may be established a constant whirling body of dissociated carbon always kept incandescent with water heating agent.

In order to insure no mixture of the gases of combustion into the natural gas to be dissociated I provide a pipe 19 through which pure nitrogen, or other desirable medium, may be forced under considerable pressure into a thin annular sheath 20 surrounding the burner 12 and is there directed upwardly forming a shield about the flame A—B from the burner to the flue as indicated between the dot-and-dash lines B and C. Furthermore, at the flue 11, I provide an annular chamber 21 arranged with one or more suction pipes 22, the suction above and pressure below insuring the passage of the gaseous shield through the chamber. While either pressure or suction alone may be sufficient for this purpose, I prefer to use both so as to be perfectly safe.

The dissociated carbon being heavier will be forced outwardly and taken off through a pipe 23, part of this being sent through pipes 13 and 18 for the purpose above set forth. Partly dissociated gas, if any, may be cut out by a baffle 24 and returned by a pipe 25 to the lead 16 and passes through the process again, and the hydrogen is cut out by a baffle 26 and conducted away by a pipe 27.

Figure 3:
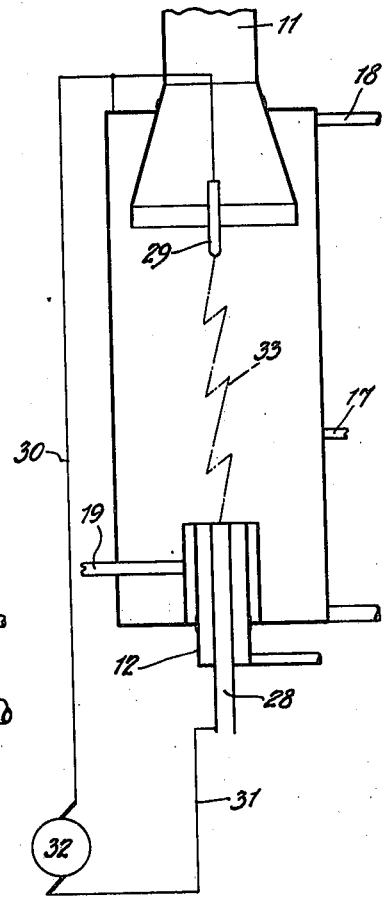
Fig. 3 is a view similar to Fig. 1 but showing radiant heat amplifying means.
Figure 2:
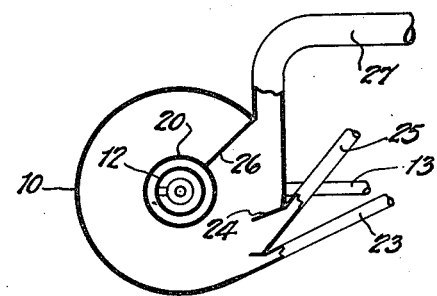
Fig. 2 is a horizontal sectional view taken substantially on line 2—2 of Fig. 1.

In Fig. 3 I have shown in somewhat diagrammatic form the device of Fig. 1, with an electrode 28 in the center of the burner 12, an electrode 29 at the center of the upper portion, connections 30 and 31 to a suitable source of electric supply 32, and an arc at 33 passing through the vortex of the flame and increasing the speed of the process. This device would be particularly effective and could be used to advantage where cheap electric power was obtainable, or off-peak loads could be made available. While I have shown an arc at 33, it is to be understood that axial combustion of higher temperature than the surrounding flame may be utilized in place of electric energy.

Thus by the apparatus and process described, I produce chemically pure hydrogen and chemical carbon. The hydrogen may be utilized for various purposes, such as the manufacture of synthetic ammonia, and for hydrogenating the by-products of petroleum.

The chemical carbon may be utilized for various purposes. In Fig. 5 I have shown a device for making use of this carbon for raising the flame temperature of a combustible gas. Here I have shown the chemical carbon as collected in a receptacle 34 and fed into a stream of natural gas at 35 and carried to the ignition point 36 where its flow is accelerated by jets of air or the like as indicated at 37. In this manner the products of combustion of natural gas with carbon added is the same as acetylene with a resulting high flame temperature. In like manner chemical carbon added in suitable proportions to combust with water gas may double its B. t. u. value and greatly increase its flame temperature. These are, however, merely illustrative of the many possible uses.

Without limiting myself to any special form of apparatus for working this process, Fig. 6 shows a preferred form. In the dissociator shown in Fig. 6, the wall 10 is constructed as a series of annular portions 40 of progressively greater diameters, the topmost being of least diameter and the lowermost being of greatest diameter. A portion of chemical carbon may be initially carried in by natural gas tangentially under pressure at the top portion of the dissociator by pipes 41; and at the top of each succeeding portion 40, natural gas alone is entered tangentially under pressure next to the wall by pipes 42. As the carbon and natural gas swirl about the top portion 40, the carbon becomes heated and the natural gas is dissociated adding to the carbon. The carbon being heavier, is forced toward the wall by centrifugal action, and as it whirls below the first offset, is forced outwardly again by centrifugal action thru the new stream of natural gas causing dissociation of the latter, having entered that side of the current of natural gas nearer the axis. At each offset the carbon is forced outwardly thru the new natural gas, and as the volume of carbon becomes greater thru cumulative effect as it passes down, due to additions from the dissociated gas, the amount of new natural gas brought in may be larger at the lower pipes 42. The swirling action is increased by impetus from each succceeding tier of pipes 42.

The bottom of the dissociator 10 may be formed with an annular trough 43 having take-off leads 44 entering a circular conduit or manifold 45. The dissociated carbon and hydrogen pass off thru conduit 45, or separate outlets not shown, to a tank or tanks 46 where they are sprayed with water indicated at 47 for the purpose of lowering their temperature, but not down to dew point. After this they rise to 48 and are carried off by any suitable means such as pipe 49; here the carbon may be separated from the gas in suitable apparatus 50 if not already separated, and any sediment or water collecting in the bottom of 46 is passed into trap 51.

It is to be noted that I not only make use of the heat from the axial flame indirectly from the heated walls or acting directly on the natural gas to dissociate the latter, but also make use of the heat taken up by the carbon to dissociate further natural gas thus greatly accelerating the process by forcing these incandescent solid bodies thru the gas to be dissociated.

In other words, this is not an intermittent, but a continuous process; and the required heat is supplied directly and/or indirectly to the gas or hydrocarbon to be dissociated from a source inside of the dissociation chamber and/or thru incandescent carbon passing thru new natural gas to be dissociated, the carbon being maintained in incandescent condition thru such internal heat of radiant or other character. Neither natural gas pressures above atmosphere nor incandescent foreign matter is required to break down methane, but showers of incandescent dissociated carbon are continuously passed thru new natural gas and rapidly dissociate this new natural gas. The absorbed heat taken from the incandescent carbon particles is continuously being renewed by the radiant and other heat from the heating agent.

Furthermore, it will be noted that the swirling action does not permit the dissociated carbon to lodge and "bake" so as to become gritty. During the dissociation proccess, the carbon dissociated continuously increases the primary carbon but will remain in suspension and not accrete itself to the primary carbon so long as the current in which it travels remains at some velocity.

While I have described what I consider to be the most desirable manner of carrying my invention into effect, it is obvious that many of the details could be varied without departing from the spirit of my invention, and I, therefore, do not limit myself to the exact details set forth nor to anything less than the whole of my invention as herein described and as hereinafter claimed.

I claim:

1. The process of dissociating natural gas which includes feeding natural gas to a dissociator, maintaining an axial flame therein, the passing of a shower of carbon heated to and maintained at incandescence by said flame through the gas to be dissociated, and the entering of new natural gas into the dissociator tangentially along the wall so that dissociated carbon can shower through it.

2. The process which includes the entering of chemical carbon near the top of a dissociator, maintaining an axial flame therein, entering natural gas tangentially next to the wall and at varying distances from the flame, and forcing carbon past said flame to be heated and then thru the natural gas at the points of entry of the natural gas whereby said heated carbon will dissociate said gas.

3. The process of dissociating natural gas which comprises maintaining in a chamber an axial combustion zone, feeding natural gas tangentially into said chamber whereby to whirl said gas around said zone, passing comminuted carbon in marginal contact with said zone to heat said carbon, and mingling the heated carbon with the natural gas.

4. The process of dissociating natural gas which comprises maintaining in a chamber an axial combustion zone in one direction, passing natural gas through the chamber in an opposite direction, passing comminuted carbon along a path adjacent to said zone whereby to heat the carbon to incandescence and causing said heated carbon to mingle with said gas whereby to dissociate the latter.

5. The process of dissociating natural gas which comprises maintaining in a chamber an axial heating flame, feeding natural gas to said chamber in a path around said flame, passing comminuted carbon into said chamber and adjacent to said flame to be heated thereby and then causing the heated carbon to mingle with said gas to heat and dissociate the gas.

6. The process of dissociating natural gas which comprises maintaining in a chamber an axial heating flame, feeding natural gas to said chamber in a path to swirl around the flame, feeding comminuted carbon to said chamber tangentially in a path around said flame thereby to be heated to incandescence, and then causing said heated carbon to mingle with said gas whereby to dissociate same, and withdrawing the dissociated gas products from said chamber.

7. The process of dissociating natural gas which comprises maintaining in a chamber an axial heating flame, feeding natural gas to said chamber around said flame, passing carbon particles past said flame to be heated thereby, passing the heated carbon through said natural gas to dissociate same into hydrogen and carbon, withdrawing a portion of the dissociated carbon and passing it into the chamber to be heated by said flame.

8. The process of dissociating natural gas which comprises maintaining in a chamber an axial heating flame, feeding natural gas to said chamber around said flame to be heated thereby to dissociate the gas into hydrogen and carbon, withdrawing from the chamber a portion of the dissociated carbon and passing it into the chamber in marginal contact with said flame, and causing said carbon to mingle with said gas to facilitate its dissociation.

9. The process of dissociating natural gas which comprises maintaining in a chamber an axial combustion zone, feeding natural gas tangentially into said chamber whereby to whirl said gas around said zone, passing comminuted carbon in marginal contact with said zone to heat said carbon, mingling the heated carbon with the natural gas to dissociate same, and maintaining a shield of inert gas between the combustion zone and the body of natural gas.

10. The process as set forth in claim 9 comprising withdrawing partly dissociated gas from said chamber and mixing same with the supply of natural gas being passed into said chamber.

11. The process of dissociating natural gas which comprises maintaining in a chamber an axial heating flame, feeding natural gas to said chamber tangentially to the wall, passing carbon particles past said flame and between the flame and said natural gas, to be heated thereby, passing the heated carbon through said natural gas to dissociate same through the heat continuously taken up by the suspended carbon particles from heat from the flame and as incandescent solid black bodies contacting with the enveloping natural gas which is thereby dissociated into hydrogen and carbon, and this carbon in turn adding itself to the original carbon to become suspended incandescent solid black bodies and so augment the process.

12. The process set forth in claim 11 comprising withdrawing a portion of the dissociated carbon and passing same into the chamber to be heated by said flame.

In testimony whereof I affix my signature.

CHARLES B. HILLHOUSE.